June 8, 1943. S. LIEBERMAN 2,321,220
WATER FILTER
Filed Nov. 18, 1941

Inventor
Samuel Lieberman
by Wright, Brown, Quinby & May
Attys.

Patented June 8, 1943

2,321,220

UNITED STATES PATENT OFFICE 2,321,220

WATER FILTER

Samuel Lieberman, Boston, Mass.

Application November 18, 1941, Serial No. 419,589

1 Claim. (Cl. 210—77)

This invention relates to a filter adapted to be readily attached to a standard cold water faucet or hot water faucet.

It is an object of the invention to provide a filter which can be easily attached to either type of faucet in such a manner as to make a tight joint. It is another object of the invention to provide a filter in which the filter element can easily be removed and replaced. It is another object of the invention to provide a filter having a discharge spout adapted to receive a rubber tube by which the filtered water can be directed to any desired point.

The water filter hereinafter described is particularly designed for use in photographic studios where it is desirable to avoid dirt and specks in water which is supplied to trays for washing negatives, prints and the like. A light rubber tube can be employed to direct the filtered water to any one of a number of trays in the work room of the studio.

For a more complete understanding of the invention, reference may be had to the following description thereof, and to the drawing of which Figure 1 is an elevational view of a filter embodying the invention, a portion being broken away to show in section.

Figure 2:
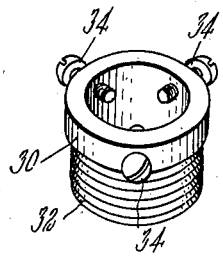
Figure 2 is a perspective view of a nipple which can be used with the filter.
Figure 3:
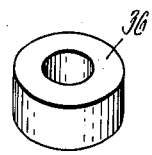
Figure 3 is a perspective view of a rubber gasket adapted for use in the nipple shown in Figure 2.

The filter shown on the drawing includes a casing comprising two parts 10 and 12 in screw-threaded engagement. The upper part 10 includes a depending skirt 14 which is externally threaded for engagement with the internally threaded rim 16 of the lower part 12. Both parts 10 and 12 are preferably made of a suitable plastic such as "Bakelite" or other equivalent synthetic resin which may be impervious to ordinary solvents, heat, etc. The upper part 10 is made with an upstanding integral neck portion 20 which is of a diameter less than that of the skirt 14 but sufficient to receive the threaded end portion of a standard cold-water faucet. The neck 20 is internally screw-threaded for this purpose and an inner shoulder 22 is provided at the base of the neck to receive a suitable rubber gasket 24 against which the extremity of the cold-water faucet 26 may press so as to make a tight waterproof joint.

Figure 4:
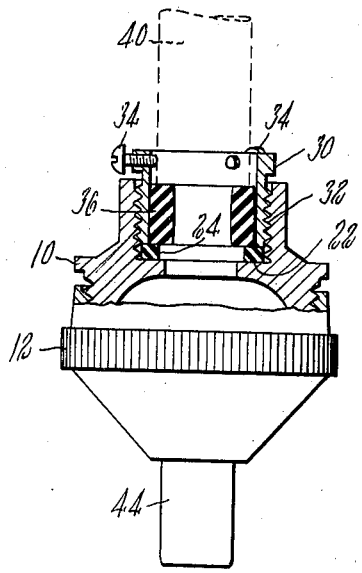
Figure 4 is an elevation of the filter together with the nipple and gasket, a portion being broken away to show in section.

In order to adapt the filter for attachment to a standard hot-water faucet, a nipple 30 is provided, this nipple having a lower portion 32 which is screw-threaded for engagement in the neck 20. The interior diameter of the nipple is such as to receive the lower end portion of a standard hot-water faucet with an easy fit. A number of set-screws 34 project radially through the upper end portion of the nipple 30 and are screw-threaded therein. These set-screws are angularly spaced from each other and are adapted to bear against the lower end portion of a hot-water faucet inserted in the nipple to secure the nipple firmly to the faucet. A tubular rubber gasket 36 is provided to fit loosely in the nipple 30 so as to bear against the end of a faucet inserted in the nipple. In mounting the filter on a hot-water faucet 40 such as is indicated in Figure 4, the nipple is secured thereon by means of the set-screws 34 in such a manner that the gasket 36, when inserted in the nipple below the end of the faucet, will project below the lower edge of the nipple. The filter is then screwed onto the threaded portion 32 of the nipple until the gasket 24 bears strongly against the lower end of the gasket 36 and presses the latter tightly against the end of the faucet 40. If desired, the gasket 24 may be omitted, in which case the lower end of the gasket 36 will bear directly on the shoulder 22. In either case the threaded engagement between the nipple 30 and the filter neck 20 provides a ready means for setting up the filter tightly on a hot-water faucet.

The lower part 12 of the casing is preferably frusto-conical in shape and is provided with a central discharge aperture 42 through which projects a discharge spout 44. This spout has a flange 46 at its upper end and is press-fitted in the aperture 42 so that no screw threads are required to hold it in place. The flange 46 seats against the inner surface of the part 12 immediately surrounding the aperture 42. The spout 44 is adapted to receive a soft rubber tube by which the effluent from the filter can be directed as desired.

Figure 1:
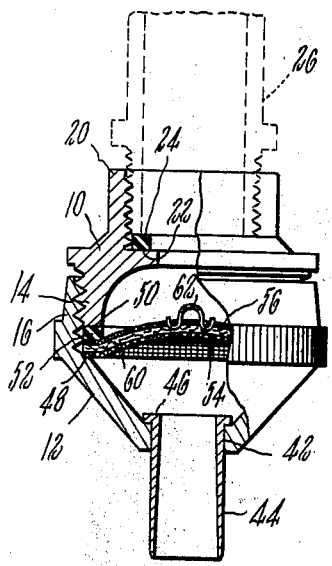

Within the filter casing a filter unit is clamped in place by being marginally gripped between a shoulder 48 in the lower part 12 and the lower edge 50 of the skirt 14. A soft rubber gasket 52 is preferably employed to prevent leakage of unfiltered water around the edges of the filter unit. The filter unit comprises a lower foraminous plate 54 and an upper foraminous plate 56 between which is supported a soft fibrous element 60 which may be made of woven or felted cotton or other suitable material for the purpose. The filter unit is preferably domed upward as indicated in Figure 1 and is of such diameter that the lower plate 54 fits tightly in the casing so that it is not easily removed. The upper plate 56 is made with a snug fit but is capable of ready removal by means of a purchase element 62 which may be in the form of a loop, knob or other element which can be engaged by the fingers or by a suitable tool. When the lower part 12 of the filter casing is detached, the upper plate 56 is thus readily removable therefrom so as to permit removal and replacement of the soft filter element 60 which is normally supported between the plates.

It is evident that various changes and modifications may be made in the embodiments of the invention herein shown and described without departing from the spirit or scope thereof as defined in the following claim.

I claim:

In a water filter having a casing, a tubular neck projecting up from said casing and internally screw-threaded, said casing having an internal shoulder at the lower end of said neck, a nipple in threaded engagement within said neck, said nipple having an interior diameter of a size to receive the end portion of a faucet with a loose fit, a plurality of set-screws threaded through the upper end portion of said nipple and projecting radially therefrom, a tubular rubber gasket fitted within the nipple and adapted to be compressed between the lower end of a faucet secured in said nipple and said shoulder at the base of said neck, and a filtering element within said casing.

SAMUEL LIEBERMAN.